(12) United States Patent
Yokoyama et al.

(10) Patent No.: US 11,680,539 B2
(45) Date of Patent: Jun. 20, 2023

(54) INTERNAL COMBUSTION ENGINE WITH TURBOCHARGER

(71) Applicant: MITSUBISHI HEAVY INDUSTRIES ENGINE & TURBOCHARGER, LTD., Sagamihara (JP)

(72) Inventors: Takao Yokoyama, Tokyo (JP); Makoto Ozaki, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 129 days.

(21) Appl. No.: 16/964,819

(22) PCT Filed: Jan. 29, 2018

(86) PCT No.: PCT/JP2018/002807
§ 371 (c)(1),
(2) Date: Jul. 24, 2020

(87) PCT Pub. No.: WO2019/146125
PCT Pub. Date: Aug. 1, 2019

(65) Prior Publication Data
US 2021/0062751 A1    Mar. 4, 2021

(51) Int. Cl.
*F02F 1/42* (2006.01)
*F02B 37/02* (2006.01)
(Continued)

(52) U.S. Cl.
CPC .......... *F02F 1/4285* (2013.01); *F02B 37/025* (2013.01); *F02C 6/12* (2013.01);
(Continued)

(58) Field of Classification Search
CPC .. F02F 1/00; F02F 1/243; F02F 1/4285; F02F 7/0002; F02B 37/025; F02B 67/10;
(Continued)

(56) References Cited

U.S. PATENT DOCUMENTS 6,354,083 B1 * 3/2002 Shuttleworth ............ F02C 6/12
                                                            60/605.1
9,086,011 B2   7/2015 Roth et al.
(Continued)

FOREIGN PATENT DOCUMENTS

DE    102013001216 A1    7/2014
DE    202015103549 U1    9/2015
(Continued)

OTHER PUBLICATIONS

Extended European Search Report for European Application No. 18902267.6, dated Oct. 2, 2020.
(Continued)

*Primary Examiner* — Loren C Edwards
(74) *Attorney, Agent, or Firm* — Birch, Stewart, Kolasch & Birch, LLP

(57) ABSTRACT

An internal combustion engine with a turbocharger according to an embodiment includes a cylinder block internally including a plurality of cylinders, a cylinder head disposed on top of the cylinder block, and internally including a plurality of exhaust flow passages through which exhaust air discharged from each of the plurality of cylinders flows, and the turbocharger including a rotational shaft, a turbine wheel, and a compressor wheel, the turbine wheel being disposed at one end of the rotational shaft, the compressor wheel being disposed at the other end of the rotational shaft. At least the turbine wheel of the turbocharger is arranged inside the cylinder head. The cylinder head internally includes a plurality of scroll passages for introducing the exhaust air flowing through the plurality of exhaust flow passages to the turbine wheel, the plurality of scroll passages including a first scroll passage for introducing the exhaust air from a first range in a circumferential direction of the turbine wheel to the turbine wheel, and a second scroll passage for introducing the exhaust air from a second range,
(Continued)

which is different from the first range in the circumferential direction of the turbine wheel, to the turbine wheel.

7 Claims, 5 Drawing Sheets

(51) Int. Cl.
*F02C 6/12* (2006.01)
*F02C 7/06* (2006.01)
*F02C 7/36* (2006.01)
*F02F 7/00* (2006.01)

(52) U.S. Cl.
CPC .................. *F02C 7/06* (2013.01); *F02C 7/36* (2013.01); *F02F 7/0002* (2013.01); *F05D 2220/40* (2013.01); *F05D 2240/50* (2013.01); *F05D 2240/60* (2013.01)

(58) Field of Classification Search
CPC ...... F02C 6/12; F02C 7/06; F02C 7/36; F05D 2220/40; F05D 2240/50; F05D 2240/60; F04D 29/4206; F04D 29/601
See application file for complete search history.

(56) References Cited

U.S. PATENT DOCUMENTS

| | | | |
|---|---|---|---|
| 2005/0056015 A1 | 3/2005 | Fledersbacher et al. | |
| 2011/0132296 A1 | 6/2011 | Kuhlbach | |
| 2013/0055713 A1* | 3/2013 | Drangel | F02F 1/243 60/605.1 |
| 2013/0247566 A1* | 9/2013 | Lombard | F02B 37/162 60/605.1 |
| 2015/0292393 A1 | 10/2015 | Roth et al. | |
| 2016/0025044 A1 | 1/2016 | Martinez-Botas et al. | |
| 2016/0097345 A1 | 4/2016 | Penzato | |
| 2016/0138420 A1* | 5/2016 | Penzato | F01D 21/003 60/605.1 |
| 2017/0107896 A1* | 4/2017 | Gugau | F01D 25/24 |
| 2019/0048789 A1 | 2/2019 | Yoshida et al. | |
| 2019/0048791 A1 | 2/2019 | Rankenberg et al. | |
| 2019/0078504 A1 | 3/2019 | Yoshida et al. | |

FOREIGN PATENT DOCUMENTS

| | | | | |
|---|---|---|---|---|
| EP | 2256314 A1 | 12/2010 | | |
| JP | 62-162728 A | 7/1987 | | |
| JP | S62162728 A | * 7/1987 | ............. | F02B 37/00 |
| JP | 63-17832 U | 2/1988 | | |
| JP | 2002-303145 A | 10/2002 | | |
| JP | 2005-527728 A | 9/2005 | | |
| JP | 2006-63851 A | 3/2006 | | |
| JP | 2006-249945 A | 9/2006 | | |
| JP | 2011-536666 A | 12/2011 | | |
| JP | 2016-70273 A | 5/2016 | | |
| WO | WO 2017/150643 A1 | 9/2017 | | |
| WO | WO 2017/169515 A1 | 10/2017 | | |
| WO | WO 2017/169517 A1 | 10/2017 | | |

OTHER PUBLICATIONS

International Preliminary Report on Patentability and Written Opinion of the International Searching Authority with an English translation, dated Aug. 13, 2020, for International Application No. PCT/JP2018/002807.

International Search Report dated Apr. 3, 2018, for International Application No. PCT/JP2018/002807, with an English translation.

* cited by examiner

INTERNAL COMBUSTION ENGINE WITH TURBOCHARGER

TECHNICAL FIELD

The present disclosure relates to an internal combustion engine with a turbocharger.

BACKGROUND

In an internal combustion engine including a plurality of cylinders, air supply and exhaust are performed through an air supply manifold and an exhaust manifold, complicating the configuration of an air supply and exhaust flow passage. Thus, an attempt on downsizing is made by incorporating these manifolds into a cylinder head. Patent Document 1 discloses a configuration in which an exhaust manifold is incorporated into a cylinder head.

In an internal combustion engine including a turbocharger in addition to the plurality of cylinders, a structure in the periphery of the cylinder head is further complicated. Thus, an attempt on downsizing by also incorporating the turbocharger into the cylinder head is proposed. For example, Patent Document 2 discloses an internal combustion engine with the capacity of an exhaust flow passage being reduced by arranging a turbocharger in a cylinder head. Moreover, Patent Document 3 discloses a configuration which facilitates manufacture of a scroll portion by forming a turbine scroll portion on the surface of a cylinder block and forming a compressor scroll portion on the surface of a cylinder cover, upon arranging a turbocharger in a cylinder head.

CITATION LIST

Patent Literature

Patent Document 1: JP2011-530666A
Patent Document 2: JP2002-303145A
Patent Document 3: JP2006-249945A

SUMMARY

Technical Problem

The cylinder head disclosed in each of Patent Documents 2 and 3 includes a conventional exhaust manifold which has a plurality of exhaust flow passages merging upstream of the turbine scroll portion of the turbocharger to be one exhaust flow passage connecting to the turbine scroll portion. Since the conventional exhaust manifold is arranged inside the cylinder head disclosed in each of Patent Documents 2 and 3, downsizing is limited, and the capacity of the cylinder head is large.

Furthermore, a rotational shaft of the turbocharger disclosed in Patent Document 3 is arranged along the vertical direction, and thus new measures and means are needed for a bearing portion for pivotally supporting the rotational shaft.

The object of some embodiments is to downsize the cylinder head of the internal combustion engine including the plurality of cylinders and the turbocharger, and the peripheral structure thereof.

Solution to Problem (1) An internal combustion engine with a turbocharger according to an embodiment includes a cylinder block internally including a plurality of cylinders, a cylinder head disposed on top of the cylinder block, and internally including a plurality of exhaust flow passages through which exhaust air discharged from each of the plurality of cylinders flows, and the turbocharger including a rotational shaft, a turbine wheel, and a compressor wheel, the turbine wheel being disposed at one end of the rotational shaft, the compressor wheel being disposed at the other end of the rotational shaft. At least the turbine wheel of the turbocharger is arranged inside the cylinder head. The cylinder head internally includes a plurality of scroll passages for introducing the exhaust air flowing through the plurality of exhaust flow passages to the turbine wheel, the plurality of scroll passages including a first scroll passage for introducing the exhaust air from a first range in a circumferential direction of the turbine wheel to the turbine wheel, and a second scroll passage for introducing the exhaust air from a second range, which is different from the first range in the circumferential direction of the turbine wheel, to the turbine wheel.

With the above configuration (1), since the plurality of scroll passages introduce the exhaust air to the different ranges in the circumferential direction of the turbine wheel, the plurality of scroll passages are dispersedly arranged in the periphery of the turbine wheel. Thus, the plurality of scroll passages can each select a position where a corresponding one of the exhaust flow passages has the shortest length in the circumferential direction of the turbine wheel. Thus, it is possible to downsize the exhaust flow passages in the cylinder head.

Moreover, at least the turbine wheel of the turbocharger is arranged inside the cylinder head. Accordingly, it is unnecessary to form a linking portion or the like in order to mount a turbocharger of a separate piece, which is arranged outside the cylinder head, on the cylinder head. Thus, it is possible to downsize the cylinder head and the peripheral structure thereof. Moreover, since the turbine wheel is disposed in the cylinder head, it is possible to shorten a distance between each of the cylinders and the turbine wheel, and thus to reduce the capacity of the corresponding one of the exhaust flow passages. Thus, it is possible to downsize the cylinder head and to improve response performance of the turbocharger.

Moreover, in the above configuration (1), the plurality of scroll passages for introducing the exhaust air flowing through the plurality of exhaust flow passages to the turbine wheel introduces the exhaust air to the different ranges in the circumferential direction of the turbine wheel. That is, the ranges, where the exhaust air flowing into the turbine wheel from the respective scroll passages flows, are limited to the some ranges of a nozzle flow passage in the circumferential direction of the turbine wheel. In such a case where the exhaust air is introduced to the some ranges of the nozzle flow passage, the exhaust air is not dispersed as compared with a case where the exhaust air is introduced to all the ranges of the nozzle flow passage. Thus, it is possible to increase a flow velocity and pressure of the exhaust air when passing through the turbine wheel. Thus, it is possible to drive the turbine wheel more quickly.

Moreover, in the above configuration (1), the respective scroll passages are configured so as not to overlap in the circumferential direction of the nozzle flow passage. In the case of so-called twin scroll where the respective scroll passages are configured to overlap in the circumferential direction, the nozzle flow passage, where the exhaust air flows into the turbine wheel from the scroll passages, needs to be divided, and thus manufacture is not easy. With the above configuration (1), the scroll passages are manufactured easily as compared with the twin scroll.

(2) In an embodiment, in the above configuration (1), the exhaust air flowing through at least two exhaust flow passages of the plurality of exhaust flow passages is introduced to at least one of the first scroll passage or the second scroll passage.

With the above configuration (2), since at least the two exhaust flow passages merge to one scroll passage upstream of the turbine wheel, it is possible to downsize a piping group forming the exhaust flow passages.

(3) In an embodiment, in the above configuration (1), the exhaust air flowing through the plurality of exhaust flow passages is introduced to the plurality of scroll passages, respectively.

With the above configuration (3), since one exhaust flow passage communicates with one scroll passage, it is possible to dispersedly arrange the same number of scroll passages as the exhaust flow passages in the circumferential direction of the turbine wheel. Thus, it is possible to further minimize the length of each of the exhaust flow passages in the cylinder head to allow downsizing, and to increase the driving force of the turbine wheel.

(4) In an embodiment, in any one of the above configurations (1) to (3), the turbocharger includes a bearing portion for rotatably supporting the rotational shaft, and the bearing portion is arranged inside the cylinder head.

With the above configuration (4), since not only the turbine wheel, but also the bearing portion are arranged inside the cylinder head, it is possible to further downsize the cylinder head and the peripheral structure thereof.

(5) In an embodiment, in the above configuration (4), the compressor wheel is arranged inside the cylinder head.

With the above configuration (5), since not only the turbine wheel and the bearing portion, but also the compressor wheel are arranged inside the cylinder head, it is possible to further downsize the cylinder head and the peripheral structure thereof.

(6) In an embodiment, in any one of the above configurations (1) to (4), the compressor wheel is arranged outside the cylinder head.

With the above configuration (6), since the compressor wheel is arranged outside the cylinder head, the supply air flowing into the compressor wheel is prevented from being influenced by heat of the exhaust air flowing through the exhaust flow passages. Thus, it is possible to suppress an increase in temperature of the supply air, making it possible to improve cooling efficiency of the supply air supercharged to combustion chambers. As a result, the limit of an engine output can be maintained high.

(7) In an embodiment, in any one of the above configurations (1) to (6), the plurality of cylinders are arranged along a first direction, and the rotational shaft extends along a second direction orthogonal to the first direction, as seen along an axial direction of each of the cylinders (a planar view is obtained when the axis of each of the cylinders is arranged along the vertical direction).

With the above configuration (7), since the rotational shaft extends along the second direction, it is possible to arrange a scroll portion, which is arranged in the periphery of the turbine wheel, along the first direction having a large space. Therefore, since the scroll portion is easily formed into a shape suitable for an exhaust flow, it is possible to suppress decreases in turbine efficiency and supercharging efficiency.

(8) In an embodiment, in the above configuration (7), the rotational shaft is arranged in a center part of the plurality of cylinders in an arrangement direction of the plurality of cylinders.

With the above configuration (8), since the rotational shaft is arranged in the center part of the plurality of cylinders in the arrangement direction of the plurality of cylinders, the turbine wheel and the compressor wheel are arranged in the center part in the arrangement direction of the plurality of cylinders. Therefore, it is possible to averagely shorten the length of each of the exhaust flow passages or each of the air supply flow passages introduced from the corresponding one of the cylinders to the turbine wheel or the compressor wheel. Thus, it is possible to reduce the capacity of the cylinder head accommodating the exhaust flow passages and the air supply flow passages. Moreover, the total capacities of the exhaust flow passages from the combustion chambers to the turbine wheel of the internal combustion engine are reduced, making it possible to improve response characteristics of the turbocharger at the time of, for example, acceleration of a vehicle with the internal combustion engine and to remedy a turbo lag.

(9) In an embodiment, in the above configuration (7) or (8), the turbine wheel is arranged on one side and the compressor wheel is arranged on another side, across the plurality of cylinders arranged along the first direction.

With the above configuration (9), since the turbine wheel is arranged on one side with respect to the arrangement of the plurality of cylinders, the exhaust flow passages introduced from the cylinders to the turbine wheel, respectively, are arranged easily, making it possible to shorten the length of each of the exhaust flow passages. The same is also applicable to the air supply flow passages.

Furthermore, since the turbine wheel and the compressor wheel are arranged on the both sides across the plurality of cylinders arranged along the first direction, a compressor portion is less influenced by the heat of the exhaust air flowing through the exhaust flow passages. Thus, it is possible to improve cooling efficiency of the supply air supercharged to the combustion chambers, making it possible to maintain the limit of the engine output high.

Advantageous Effects

According to some embodiments, it is possible to downsize a cylinder head of an internal combustion engine including a plurality of cylinders and a turbocharger, and a peripheral structure thereof.

DETAILED DESCRIPTION

Figure 1:
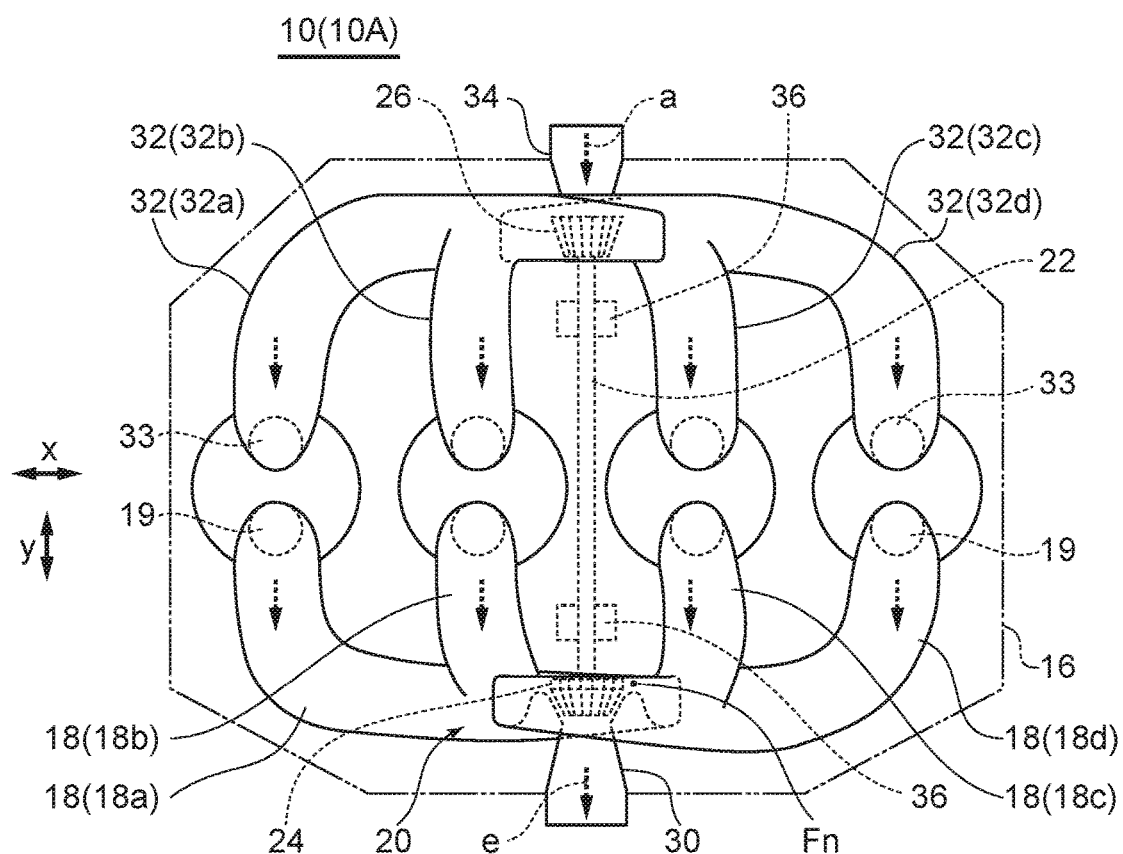
FIG. 1 is a plan view of an internal combustion engine according to an embodiment.

Some embodiments of the present invention will be described below with reference to the accompanying drawings. It is intended, however, that unless particularly specified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expressions such as "comprising", "including", "having", "containing", and "constituting" one constitutional element are not intended to be exclusive of other constitutional elements.

FIGS. 1 to 5 show internal combustion engines 10 (10A, 10B, 10C) each with a turbocharger according to some embodiments.

In FIGS. 1 to 5, the internal combustion engines 10 (10A to 10C) each include a cylinder block 12 internally including a plurality of cylinders 14 (14a, 14b, 14c, 14d). A cylinder head 16 is disposed on top of the cylinder block 12. The cylinder block 12 internally includes a plurality of exhaust flow passages 18 (18, 18b, 18c, 18d) through which exhaust air e discharged from the respective cylinders 14 (14a to 14d) flows. In addition, the internal combustion engine 10 includes a turbocharger 20. The turbocharger 20 includes a rotational shaft 22. The rotational shaft 22 includes a turbine portion formed on one end side thereof and a compressor portion formed on the other end side thereof. The rotational shaft 22 includes a turbine wheel 24 in the turbine portion and includes a compressor wheel 26 in the compressor portion.

At least the turbine wheel 24 of the turbocharger 20 is arranged inside the cylinder head 16. The cylinder head 16 includes a plurality of scroll passages 28 including a first scroll passage 28 (28A) and a second scroll passage 28 (28B).

Figure 2:
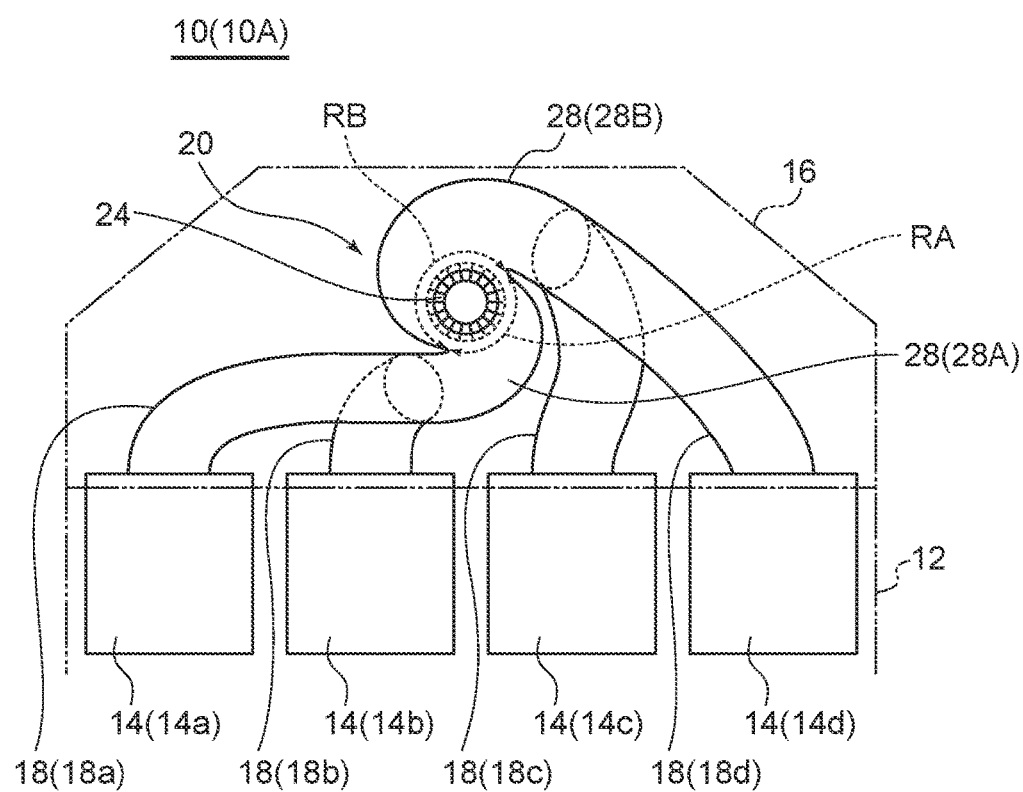
FIG. 2 is a front view of the internal combustion engine according to an embodiment.

In the embodiment shown in FIG. 2, the first scroll passage 28 (28A) is configured to introduce the exhaust air flowing through the plurality of exhaust flow passages 18 (18a, 18b) to the turbine wheel 24 and introduce the exhaust air from a first range Ra in the circumferential direction of the turbine wheel 24 to the turbine wheel 24. The second scroll passage 28 (28B) is configured to introduce the exhaust air flowing through the plurality of exhaust flow passages 18 (18c, 18d) to the turbine wheel 24 and introduce the exhaust air from a second range RB, which is different from a first range RA in the circumferential direction of the turbine wheel 24, to the turbine wheel 24.

Figure 4:
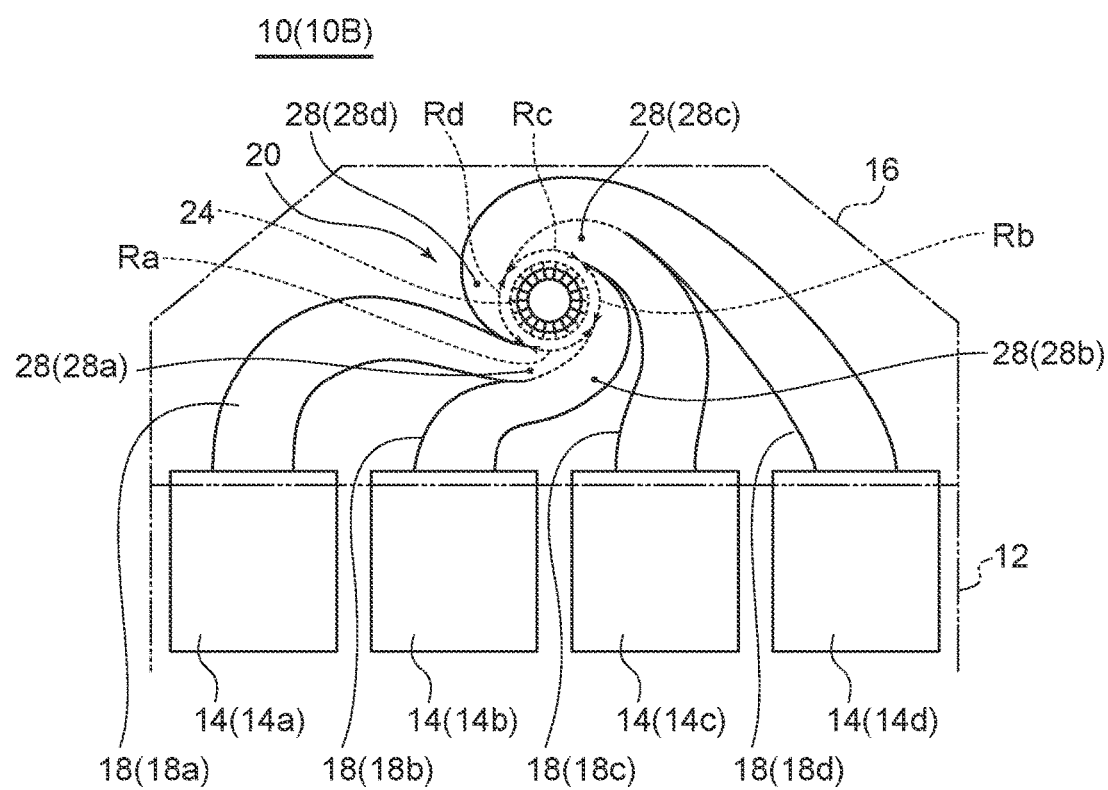
FIG. 4 is a front view of the internal combustion engine according to an embodiment.

In the embodiment shown in FIG. 4, the exhaust air e flowing through the plurality of exhaust flow passages 18 (18a, 18b, 18c, 18d) is introduced to the plurality of scroll passages 28 (28a, 28b, 28c, 28d), respectively. The respective scroll passages 28 (28a to 28d)) are configured to introduce the exhaust air from mutually different ranges Ra, Rb, Rc, and Rd in the circumferential direction of the turbine wheel 24 to the turbine wheel 24, respectively.

With the above configuration, since the plurality of scroll passages 28 introduce the exhaust air to the different ranges in the circumferential direction of the turbine wheel 24, the plurality of scroll passages 28 are dispersedly arranged in the periphery of the turbine wheel. Thus, the plurality of scroll passages 28 can each select a position where a corresponding one of the exhaust flow passages 18 has the shortest length in the circumferential direction of the turbine wheel 24. Thus, it is possible to downsize the exhaust flow passages 18 in the cylinder head.

Moreover, at least the turbine wheel 24 of the turbocharger 20 is arranged inside the cylinder head 16. Accordingly, it is unnecessary to form a linking portion or the like in order to mount a turbocharger of a separate piece, which is arranged outside the cylinder head 16, on the cylinder head 16. Thus, it is possible to downsize the cylinder head 16 and the peripheral structure thereof. Moreover, since the turbine wheel 24 is disposed in the cylinder head, it is possible to shorten a distance between each of the cylinders 14 and the turbine wheel 24, and thus to reduce the capacity of the corresponding one of the exhaust flow passages 18. Accordingly, it is possible to downsize the cylinder head 16 and to improve response performance of the turbocharger 20.

An outlet opening of the scroll passages 28, where the exhaust air e flows into the turbine wheel 24, forms a nozzle flow passage Fn having a small opening area. In the above configuration, the plurality of scroll passages 28 (28a, 28b) respectively introduce the exhaust air e to the different ranges (first range Ra, the second range Rb), which do not overlap each other, in the circumferential direction of the turbine wheel 24. That is, the ranges, where the exhaust air e flowing into the turbine wheel 24 from the respective scroll passages 28 (28a, 28b) flows, are limited to the some ranges of the nozzle flow passage Fn in the circumferential direction of the turbine wheel 24. In such a case where the exhaust air is introduced to the some ranges of the nozzle flow passage Fn, the exhaust air is not dispersed as compared with a case where the exhaust air is introduced to all the ranges of the nozzle flow passage Fn. Thus, it is possible to increase a flow velocity and pressure of the exhaust air when passing through the turbine wheel 24. Thus, it is possible to drive the turbine wheel 24 more quickly.

As a comparative example, in the case of twin scroll where the respective scroll passages are configured to overlap in the circumferential direction, the nozzle flow passage Fn needs to be divided, and thus manufacture is not easy.

By contrast, in the above-described embodiments, since the respective scroll passages 28 are configured so as not to overlap in the circumferential direction of the nozzle flow passage Fn, the scroll passages 28 are manufactured easily as compared with the twin scroll.

The structure, in which the respective scroll passages are configured to overlap in the circumferential direction, is referred to as a twin scroll structure. A structure, in which the respective scroll passages are configured so as not to overlap in the circumferential direction as in the above-described embodiments, is referred to as a double scroll structure.

In an embodiment, the exhaust air e discharged from the turbine wheel 24 is discharged outside the cylinder head 16 via an outlet flow passage 30.

In an embodiment, air supply flow passages 32 (32a, 32b, 32c, 32d) for supplying supply air 'a' to the plurality of cylinders 14, respectively, are provided. The supply air 'a' is sucked out of an inlet flow passage 34 by the compressor wheel 26 rotating in conjunction with the turbine wheel 24 rotated by the exhaust air e. The supply air 'a' is supplied to the cylinders 14 via the air supply flow passages 32, respectively.

In each of the internal combustion engines 10 (10A, 10B) shown in FIGS. 1 to 4, since the compressor wheel 26 is arranged inside the cylinder head 16, an inlet of the inlet flow passage 34 is arranged outside the cylinder head 16 and is introduced up to the compressor wheel 26.

In an embodiment, in the internal combustion engine 10 (10A) shown in FIGS. 1 and 2, the exhaust air e flowing through at least two exhaust flow passages of the plurality of exhaust flow passages 18 is introduced to at least one of the first scroll passage 28 (28A) or the second scroll passage 28 (28B). That is, in at least one of the first scroll passage 28(28A) or the second scroll passage 28 (28B), a merge portion of the exhaust flow passages exists upstream of an outlet of the scroll passage.

According to the present embodiment, since at least the two exhaust flow passages merge to one scroll passage upstream of the turbine wheel 24, it is possible to downsize a piping group forming the exhaust flow passages. Moreover, since the scroll passage 28 is divided into two along the circumferential direction of the turbine wheel 24, the exhaust air flows into the turbine wheel 24 without exhaust pulsation spreading. Thus, it is possible to increase the pressure of the exhaust air flowing into the turbine wheel 24, making it possible to drive the turbine wheel 24 more quickly.

In the internal combustion engine 10 (10A) shown in FIGS. 1 and 2, the merge portion of the exhaust flow passages 18 (18a, 18b) exists upstream of the outlet of the first scroll passage 28 (28A) in the first scroll passage 28 (28A), and the merge portion of the exhaust flow passages 18 (18c, 18d) exists upstream of the outlet of the second scroll passage 28 (28B) in the second scroll passage 28 (28B). The exhaust airs merged in these merge portions flow into the turbine wheel 24 from the first range RA and the second range RB, respectively.

In the present embodiment, since the scroll passage 28 is divided into the first scroll passage 28 (28A) and the second scroll passage 28 (28B), it is possible to reduce the capacity of each of the scroll passages. Therefore, it is possible to increase the pressure of the exhaust air flowing into the turbine wheel 24 even at the same exhaust flow rate. Furthermore, since the exhaust pulsation does not spread as described above, it is possible to further increase the pressure of the exhaust air.

A pumping loss may increase, and fuel efficiency may be deteriorated, if exhaust pressures of the plurality of cylinders are increased together. Moreover, increases in exhaust pressures of some of the cylinders may influence the other cylinders communicating with some of the cylinders having the increased exhaust pressures.

In an embodiment, the plurality of exhaust flow passages 18 merging upstream of the nozzle flow passage Fn select the exhaust flow passages 18 where the exhaust air e is discharged from the cylinders 14 having unadjacent exhaust strokes of the plurality of cylinders 14.

Since the exhaust flow passages of the cylinders having the unadjacent exhaust strokes are thus merged, it is possible to suppress interference of the exhaust pulsation.

As an example, in FIG. 2, the first cylinder 14 (14a), the third cylinder 14 (14c), the second cylinder 14 (14b), and the fourth cylinder 14 (14d) are ignited in this order, for example. In this case, the first cylinder and the third cylinder have the adjacent exhaust strokes, and the second cylinder and the fourth cylinder have the adjacent exhaust strokes. On the other hand, the first cylinder and the second cylinder have the unadjacent exhaust strokes, and the third cylinder and the fourth cylinder have the unadjacent exhaust strokes. Thus, periods, in which exhaust valves of the first cylinder and the second cylinder open, do not overlap, and periods, in which exhaust valves of the third cylinder and the fourth cylinder open, do not overlap. The interference of the exhaust pulsation does not occur, even if the exhaust flow passages 18 of the first cylinder and the second cylinder having the unadjacent exhaust strokes are merged upstream of the nozzle flow passage Fn. Likewise, the interference of the exhaust pulsation does not occur, even if the exhaust flow passages 18 of the third cylinder and the fourth cylinder are merged upstream of the nozzle flow passage Fn.

Figure 3:
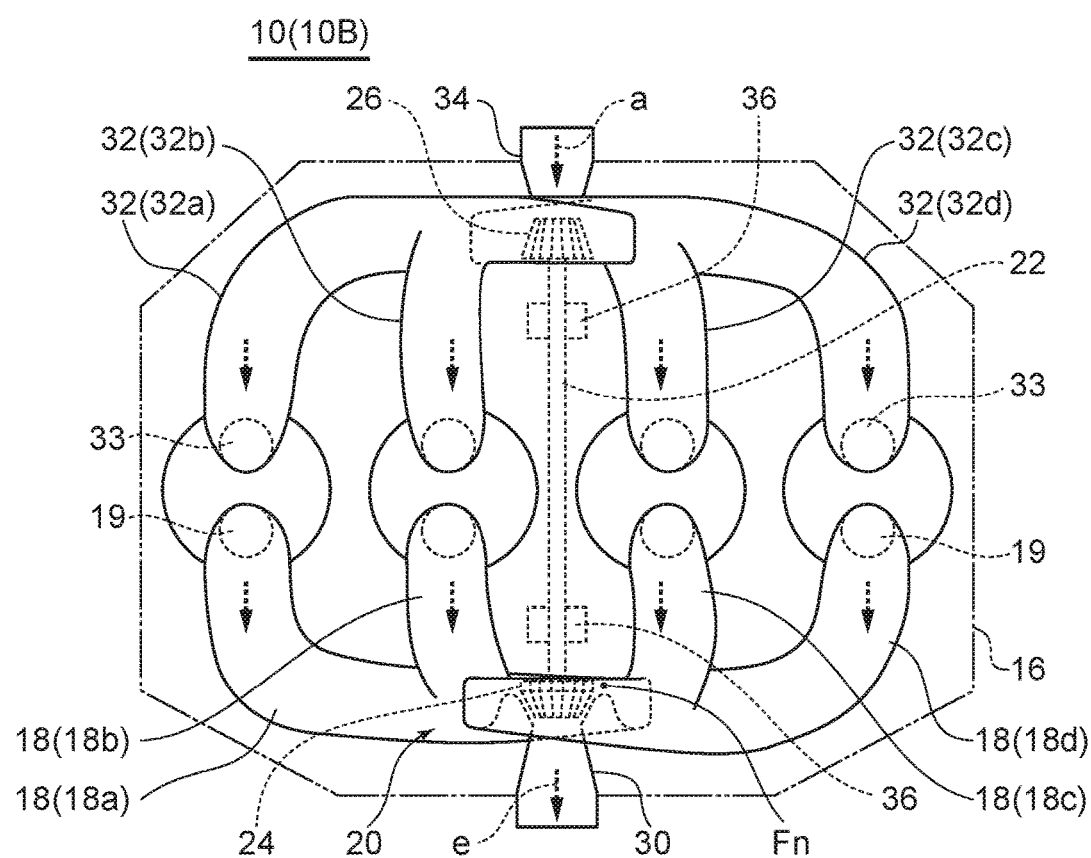
FIG. 3 is a plan view of the internal combustion engine according to an embodiment.

In an embodiment, in the internal combustion engine 10 (10B) shown in FIGS. 3 and 4, the exhaust air e flowing through the plurality of exhaust flow passages 18 (18a to 18d) is introduced to the plurality of scroll passages 28 (28a to 28d), respectively. That is, the merge portion of the exhaust flow passages does not exist upstream of the outlet of each of the scroll passages 28 (28a to 28d).

According to the present embodiment, since one exhaust flow passage communicates with one scroll passage, it is possible to dispersedly arrange the same number of scroll passages as the exhaust flow passages in the circumferential direction of the turbine wheel. Thus, as shown in FIG. 4, it is possible to form the four ranges (the first range Ra, the second range Rb, the third range Rc, and the fourth range Rd), into which the exhaust air e flows and which do not overlap each other, in the circumferential direction of the turbine wheel 24. Therefore, by connecting each of the exhaust flow passages 18 introduced from a corresponding one of the cylinders 14 to the scroll passage 28 where the exhaust air e flows in in the closest range, it is possible to minimize the length of the exhaust flow passage 18, allowing further downsizing. Moreover, by subdividing the range where the exhaust air e flows in from each of the scroll passages 28, the exhaust air flows into the turbine wheel 24 without exhaust pulsation spreading. Thus, it is possible to increase the pressure of the exhaust air flowing into the turbine wheel 24, making it possible to drive the turbine wheel 24 more quickly and to increase the driving force of the turbine wheel 24.

In an embodiment, as shown in FIGS. 1 to 5, the turbocharger 20 includes a bearing portion 36 for rotatably supporting the rotational shaft 22. The bearing portion 36 is arranged inside the cylinder head 16.

According to the present embodiment, since not only the turbine wheel 24, but also the bearing portion 36 are arranged inside the cylinder head 16, it is possible to further downsize the cylinder head 16 and the peripheral structure thereof.

In an embodiment, in each of the internal combustion engines 10 (10A, 10B) shown in FIGS. 1 to 4, the compressor wheel 26 is arranged inside the cylinder head 16.

According to the present embodiment, since not only the turbine wheel 24 and the bearing portion 36, but also the compressor wheel 26 are arranged inside the cylinder head 16, it is possible to further downsize the cylinder head 16 and the peripheral structure thereof.

Figure 5:
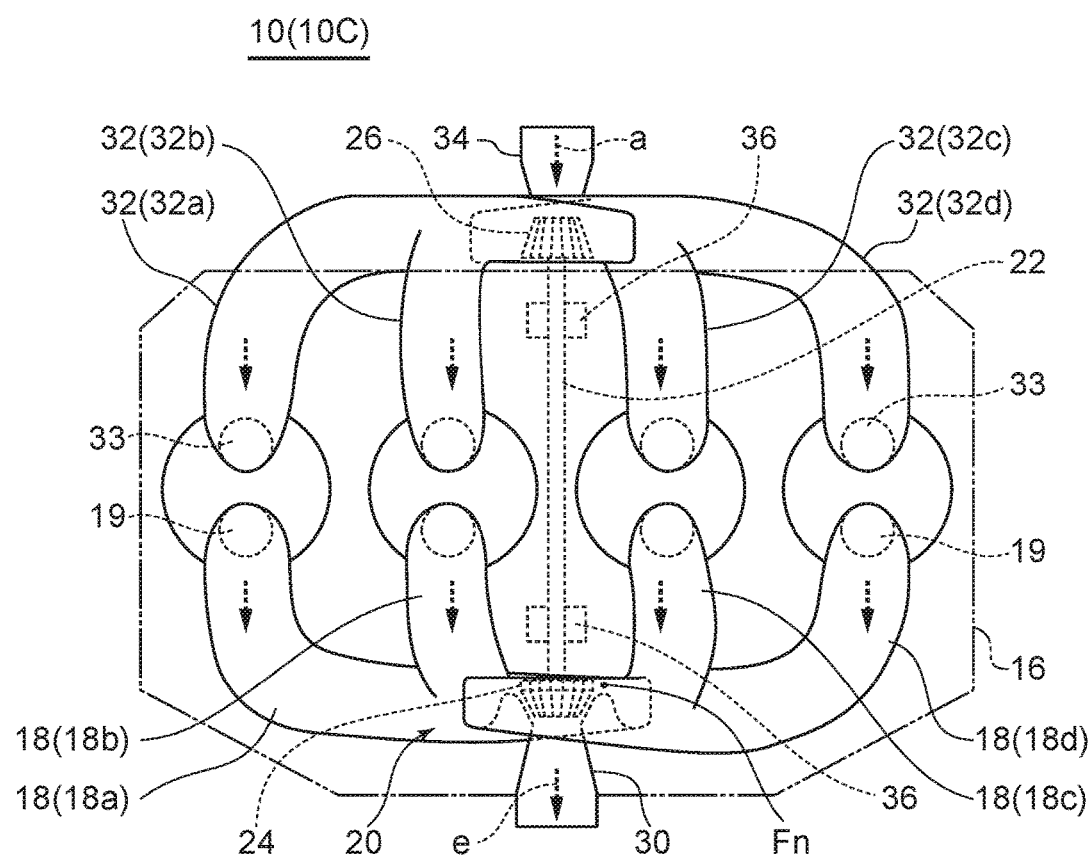
FIG. 5 is a front view of the internal combustion engine according to an embodiment.

In an embodiment, in the internal combustion engine 10 (10C) shown in FIG. 5, the compressor wheel 26 is arranged outside the cylinder head 16.

According to the present embodiment, since the compressor wheel 26 is arranged outside the cylinder head 16, the supply air 'a' flowing into the compressor wheel 26 is prevented from being influenced by heat of the exhaust air flowing through the exhaust flow passages 18. Thus, it is possible to suppress an increase in temperature of the supply air 'a', making it possible to improve cooling efficiency of the supply air 'a' supercharged to combustion chambers formed in the cylinders 14, respectively. As a result, the limit of an engine output can be maintained high.

In an embodiment, in each of the internal combustion engines 10 (10A to 10C) shown in FIGS. 1 to 5, the plurality of cylinders 14 are arranged along a first direction (a direction of an arrow x), as seen along the axial direction of each of the cylinders 14. The rotational shaft 22 extends along a second direction (a direction of an arrow y) orthogonal to the first direction, above the plurality of cylinders 14.

According to the present embodiment, since the rotational shaft 22 extends along the second direction, it is possible to arrange a scroll portion, which is arranged in the periphery of the turbine wheel 24, along the first direction having a large space. Therefore, since the scroll portion is easily formed into a shape suitable for an exhaust flow, it is possible to suppress decreases in turbine efficiency and supercharging efficiency.

The above-described "direction along the second direction" includes a direction which is oblique within a range of ±15° with respect to the direction orthogonal to the first direction.

In an embodiment, in each of the internal combustion engines 10 (10A to 10C) shown in FIGS. 1 to 5, the rotational shaft 22 is arranged above the cylinder 14 and in a center part of the plurality of cylinders 14, in an arrangement direction of the plurality of cylinders 14, in addition to the configuration of the above-described embodiment.

The "center part of the plurality of cylinders 14" means a region between the two cylinders arranged in a center of the arrangement of an even number of cylinders, and means an arrangement region of the cylinder arranged in the middle of the arrangement of an odd number of cylinders.

According to the present embodiment, since the rotational shaft 22 is arranged in the center part of the plurality of cylinders 14 in the arrangement direction of the plurality of cylinders 14, the turbine wheel 24 and the compressor wheel 26 are arranged in the center part in the arrangement direction of the plurality of cylinders 14. Therefore, it is possible to averagely shorten the length of each of the exhaust flow passages 18 or each of the air supply flow passages 32 introduced from the corresponding one of the cylinders to the turbine wheel 24 or the compressor wheel 26. Thus, it is possible to reduce the capacity of the cylinder head 16 accommodating the exhaust flow passages 18 and the air supply flow passages 32. Moreover, the total capacities of the exhaust flow passages 18 from the respective combustion chambers in the cylinders 14 to the turbine wheel 24 are reduced, making it possible to improve response characteristics of the turbocharger 20 at the time of, for example, acceleration of a vehicle with the internal combustion engine 10 and to remedy a turbo lag.

In an embodiment, in each of the internal combustion engines 10 (10A to 10C) shown in FIGS. 1 to 5, the turbine wheel 24 is arranged on one side and the compressor wheel 26 is arranged on another side across the plurality of cylinders 14 arranged along the first direction (the direction of the arrow x), as seen along the axial direction of each of the cylinders 14 (a planar view is obtained when the axis of each of the cylinders 14 is arranged along the vertical direction).

In the present embodiment, as shown in FIGS. 1 to 5, each of exhaust ports 19 is disposed in a part of the corresponding one of the cylinders close to the turbine wheel 24, and each of air supply ports 33 is disposed in a part of the corresponding one of the cylinders close to the compressor wheel 26. Therefore, the exhaust flow passages 18 introduced from the cylinders to the turbine wheel 24, respectively, are arranged easily, making it possible to shorten the length of each of the exhaust flow passages 18. The same is also applicable to the air supply flow passages 32.

Moreover, since the turbine wheel 24 and the compressor wheel 26 are arranged on the both sides across the plurality of cylinders arranged along the first direction, the compressor portion is less influenced by the heat of the exhaust air flowing through the exhaust flow passages 18. Thus, it is possible to improve cooling efficiency of the supply air 'a' supercharged to the respective combustion chambers in the cylinders 14, making it possible to maintain the limit of the engine output high.

In an embodiment, as shown in FIGS. 1 to 5, the outlet flow passage 30 is introduced from the turbine wheel 24 along the second direction (the direction of the arrow y), and a discharge port of the outlet flow passage 30 is introduced to the outside of the cylinder head 16. Moreover, the inlet flow passage 34 is introduced from the outside of the cylinder head 16 to the compressor wheel 26, and the inlet of the inlet flow passage 34 is arranged outside the cylinder head 16.

According to the present embodiment, since the outlet flow passage 30 and the inlet flow passage 34 are arranged along the second direction in the center part of the plurality of cylinders 14 in the arrangement direction of the plurality of cylinders 14, it is possible to discharge the exhaust air e from the turbine wheel 24 without increasing a flow resistance of the exhaust air e, and to supply the supply air 'a' to the compressor wheel 26 without increasing a flow resistance of the supply air 'a'. Moreover, it is possible to arrange the outlet flow passage 30 and the inlet flow passage 34 without interfering another equipment.

INDUSTRIAL APPLICABILITY

According to some embodiments, it is possible to downsize a cylinder head of an internal combustion engine including a plurality of cylinders and a turbocharger, and a peripheral structure thereof.

REFERENCE SIGNS LIST 10 (10A, 10B, 10C) Internal combustion engine
12 Cylinder block
14 (14a, 14b, 14c, 14d) Cylinder
16 Cylinder head
18 (18, 18b, 18c, 18d) Exhaust flow passage
19 Exhaust port
20 Turbocharger
22 Rotational shaft
24 Turbine wheel
26 Compressor wheel
28 (28A) First scroll passage
28 (28B) Second scroll passage
28 (28a, 28b, 28c, 28d)) Scroll passage
30 Outlet flow passage
32 (32a, 32b, 32c, 32d) Air supply flow passage
33 Air supply port
34 Inlet flow passage
36 Bearing portion Fn Nozzle flow passage
RA, Ra First range
RB, Rb Second range
Rc Third range
Rd Fourth range
a Supply air
b Exhaust air

The invention claimed is:

1. An internal combustion engine with a turbocharger, comprising:
   a cylinder block internally including a plurality of cylinders;
   a cylinder head disposed on top of the cylinder block, and internally including a plurality of exhaust flow passages through which an exhaust air discharged from each of the plurality of cylinders flows; and
   the turbocharger including a rotational shaft, a turbine wheel, and a compressor wheel, the turbine wheel being disposed at one end of the rotational shaft, the compressor wheel being disposed at the other end of the rotational shaft,
   wherein at least the turbine wheel of the turbocharger is arranged inside the cylinder head, and
   wherein the cylinder head internally includes a plurality of scroll passages for introducing the exhaust air flowing through the plurality of exhaust flow passages to the turbine wheel, the plurality of scroll passages including a first scroll passage for introducing the exhaust air from a first range in a circumferential direction of the turbine wheel to the turbine wheel, and a second scroll passage for introducing the exhaust air from a second range, the second range is different from the first range in the circumferential direction of the turbine wheel, to the turbine wheel,
   wherein the plurality of cylinders is arranged along a first direction,
   wherein the rotational shaft intersects the first direction above an upper end line of the plurality of cylinders and extends along a second direction orthogonal to the first direction, as seen along an axial direction of each of the cylinders,
   wherein the rotational shaft is arranged in a center part of the plurality of cylinders in an arrangement direction of the plurality of cylinders,
   wherein the plurality of cylinders includes one-side cylinder arranged furthest from the rotational shaft on one side with respect to the rotational shaft in the first direction, and other-side cylinder arranged furthest from the rotational shaft on the other side with respect to the rotational shaft in the first direction,
   wherein, as seen along the second direction, the first scroll passage extends along the circumferential direction of the turbine wheel and extends toward the one side with respect to the rotational shaft in the first direction,
   wherein, as seen along the second direction, the second scroll passage extends along the same direction as the first scroll passage in the circumferential direction of the turbine wheel and extends toward the other side with respect to the rotational shaft in the first direction, and
   wherein the plurality of exhaust flow passages includes a first exhaust flow passage connecting the one-side cylinder and the first scroll passage, and a second exhaust flow passage connecting the other-side cylinder and the second scroll passage.

2. The internal combustion engine with the turbocharger according to claim 1, wherein the exhaust air flowing through at least two exhaust flow passages of the plurality of exhaust flow passages is introduced to at least one of the first scroll passage or the second scroll passage.

3. The internal combustion engine with the turbocharger according to claim 1, wherein the exhaust air flowing through the plurality of exhaust flow passages is introduced to the plurality of scroll passages, respectively.

4. The internal combustion engine with the turbocharger according to claim 1, wherein the turbocharger includes a bearing portion for rotatably supporting the rotational shaft, and
   wherein the bearing portion is arranged inside the cylinder head.

5. The internal combustion engine with the turbocharger according to claim 4,
   wherein the compressor wheel is arranged inside the cylinder head.

6. The internal combustion engine with the turbocharger according to claim 1,
   wherein the compressor wheel is arranged outside the cylinder head.

7. The internal combustion engine with the turbocharger according to claim 1,
   wherein the turbine wheel is arranged on the one side with respect to the rotational shaft in the first direction and the compressor wheel is arranged on the other side with respect to the rotational shaft in the first direction.

* * * * *